US006814289B2

(12) United States Patent
Cummings et al.

(10) Patent No.: US 6,814,289 B2
(45) Date of Patent: Nov. 9, 2004

(54) SELF-REGISTERING SPREAD-SPECTRUM BARCODE METHOD

(75) Inventors: Eric B. Cummings, Livermore, CA (US); William R. Even, Jr., Livermore, CA (US)

(73) Assignee: Sandia Corporation, Livermore, CA (US)

(*) Notice: Subject to any disclaimer, the term of this patent is extended or adjusted under 35 U.S.C. 154(b) by 182 days.

(21) Appl. No.: 09/870,391

(22) Filed: May 30, 2001

(65) Prior Publication Data

US 2002/0179717 A1 Dec. 5, 2002

(51) Int. Cl.⁷ .................................................. G06K 7/10
(52) U.S. Cl. .......................... 235/462.1; 235/462.01; 235/462.11; 235/462.12
(58) Field of Search ................. 235/462.01–462.49, 235/494, 487, 382, 462.15, 456, 454; 382/116, 119, 183, 203, 205, 306

(56) References Cited

U.S. PATENT DOCUMENTS

| | | | | |
|---|---|---|---|---|
| 4,435,835 A | | 3/1984 | Sakow et al. ................... 382/8 |
| 4,934,846 A | * | 6/1990 | Gilham ........................ 400/104 |
| 4,948,955 A | | 8/1990 | Lee et al. ..................... 235/462 |
| 5,091,966 A | | 2/1992 | Bloomberg et al. ......... 235/494 |
| 5,128,525 A | | 7/1992 | Sterns et al. ................. 235/454 |
| 5,168,147 A | * | 12/1992 | Bloomberg .................. 235/456 |
| 5,221,833 A | * | 6/1993 | Hecht .......................... 235/494 |
| 5,337,361 A | * | 8/1994 | Wang et al. .................... 380/51 |
| 5,337,362 A | * | 8/1994 | Gormish et al. ............... 380/54 |
| 5,449,896 A | * | 9/1995 | Hecht et al. ................. 235/494 |
| 5,471,533 A | * | 11/1995 | Wang et al. .................... 380/51 |
| 5,506,697 A | * | 4/1996 | Li et al. ...................... 358/448 |
| 5,521,368 A | | 5/1996 | Adachi ........................ 235/462 |
| 5,644,408 A | * | 7/1997 | Li et al. ...................... 358/468 |
| 5,764,774 A | * | 6/1998 | Liu ............................. 380/269 |
| 5,811,787 A | * | 9/1998 | Schuessler et al. ......... 235/494 |
| 5,835,639 A | | 11/1998 | Honsinger et al. .......... 382/278 |
| 5,862,270 A | | 1/1999 | Lopresti et al. ............. 235/456 |
| 5,940,135 A | | 8/1999 | Petrovic et al. ............. 348/473 |
| 5,974,200 A | | 10/1999 | Zhou et al. ................ 235/462.1 |
| 6,082,619 A | | 7/2000 | Ma et al. .................. 235/462.1 |
| 6,115,508 A | | 9/2000 | Lopresti et al. ............. 235/456 |
| 6,182,901 B1 | * | 2/2001 | Hecht et al. ................. 235/494 |
| 6,418,244 B2 | * | 7/2002 | Zhou et al. .................. 382/306 |

OTHER PUBLICATIONS

Javidi (1997), "Securing Information with Optical Technologies," *Physics Today* 50:27–32.
Javidi et al. (1996), "Experimental Demonstration of the Random Phase Encoding Technique for Image Encryption and Security Verification," *Opt. Eng.* 35(9):2506–2512.

(List continued on next page.)

*Primary Examiner*—Karl D. Frech
*Assistant Examiner*—Ahshik Kim
(74) *Attorney, Agent, or Firm*—Reed & Eberle LLP

(57) ABSTRACT

A novel spread spectrum barcode methodology is disclosed that allows a barcode to be read in its entirety even when a significant fraction or majority of the barcode is obscured. The barcode methodology makes use of registration or clocking information that is distributed along with the encoded user data across the barcode image. This registration information allows for the barcode image to be corrected for imaging distortion such as zoom, rotation, tilt, curvature, and perspective.

22 Claims, 19 Drawing Sheets

OTHER PUBLICATIONS

Javidi et al. (1998), "Performance of Double Phase Encoding Encryption Technique Using Binarized Encrypted Images," *Opt. Eng. 37*(2):565–569.

Nomura et al. (2000), "Optical Encryption Using a Joint Transform Correlator Architecture," *Opt. Eng. 39*:2031–2035.

Refregier et al. (1995), "Optical Image Encryption Based on Input Plane and Fourier Plane Random Encoding," *Opt. Lett. 20*(7):767–769.

Unnikrishnan et al. (2000), "Double Random Fractional Fourier–Domain Encoding for Optical Security," *Opt. Eng. 39*:2853–2859.

Yamazaki et al. (2001), "Optimization of Encrypted Holograms in Optical Security Systems," *Opt. Eng. 40*(1):132–137.

Yang et al. (1996), "Practical Image Encryption Scheme by Real–Valued Data," *Opt. Eng. 35*(9):2473–2478.

* cited by examiner

SELF-REGISTERING SPREAD-SPECTRUM BARCODE METHOD

STATEMENT OF GOVERNMENT INTEREST

The United States Government has certain rights in this invention pursuant to Contract No. DE-AC04-94AL85000 between the United States Department of Energy and the Sandia Corporation for the operation of the Sandia National Laboratory.

TECHNICAL FIELD

This invention relates generally to two-dimensional barcodes, and, more particularly, to a spread-spectrum barcode that allows the barcode to be read in its entirety even if a significant fraction or majority of the barcode is obscured.

BACKGROUND

The visual storage of information has been widely deployed in the form of one-dimensional barcodes. Within the past decade, two-dimensional barcodes have emerged to facilitate the dense storage of data. Both one- and two-dimensional barcodes require a registration procedure, normally called "clocking" in the barcode literature, to be able to interpret the visual information. To date, a variety of clocking methods have been patented and put to use. See, for example U.S. Pat. No. 5,091,966 to Bloomberg et al., U.S. Pat. Nos. 5,862,270 and 6,115,508 to Lopresti et al., U.S. Pat. No. 6,082,619 to Ma et al., U.S. Pat. No. 4,948,955 to Lee et al., U.S. Pat. No. 5,974,200 to Zhou et al., U.S. Pat. No. 5,521,368 to Adachi, U.S. Pat. No. 5,835,639 to Honsinger et al., and U.S. Pat. No. 4,435,835 to Sakow et al. The methods currently in use rely upon fiducial marks (including blank space), placed at discrete locations within the image, to determine the position and arrangement of the barcode. If these fiduciaries are obscured, the user data within the barcode may not be recoverable. Furthermore, the user data are encoded in discrete locations within the barcode so that when any portion of the barcode image is obscured user data may be lost. This is the case even when error-correction and data redundancy are employed.

As discussed above, numerous techniques for visually encoding user data have been devised and patented. See, for example, U.S. Pat. No. 5,128,525 to Stems et al., U.S. Pat. No. 5,940,135 to Petrovic et al., and U.S. Pat. Nos. 5,862,270 and 6,115,508 to Lopresti et al. Many of the known techniques utilize two-dimensional formats. Commonly known formats include, "Aztec Code," "Data Matrix," "Data Strip Code," "MaxiCode," "PDF 417," "Micro-PDF 417," and "QR Code." Each of these conventional formats localizes data in characters or "glyphs" that are designed to facilitate machine reading. As mentioned previously, if part of the barcode is damaged or obscured, some or all of the user data may be lost. There is, therefore, a need for a method to visually encode user data so that it is not affected by damage to the barcode.

The present invention relates to a novel barcode methodology in which the user data is delocalized or distributed across the barcode image. The resulting spread-spectrum barcode may be read in its entirety even if a significant fraction or majority of the barcode is obscured. The present invention also relates to a novel barcode methodology in which the fiducial data is delocalized or distributed across the barcode image. These delocalized fiduciaries are used to register or "clock" the data, facilitating the reading of barcodes applied on curved or warped surfaces from images having significant amounts of rotation, magnification, and perspective. In the new registration methodology, the barcode reader recognizes two signature characteristics of the barcode image: a signature "texture" and a signature "pattern." These signatures are known by the barcode reader and are present regardless of the contents of user data sets within the barcode. This registration information allows the barcode image to be corrected for imaging distortions such as zoom, rotation, tilt, curvature, and perspective.

SUMMARY OF THE INVENTION

It is therefore an object of the invention to provide a method of recording information on a printed medium that will allow for retrieval of the recorded data even when significant percentage of the recorded data, i.e., greater than approximately 50% and up to approximately 80% of the recording data, is obscured.

It is an additional object of the invention to provide a method of recording information on a printed medium that will allow for accurate retrieval of the recorded data even when topography of the printed recording has been altered by bending, warping, rotation, zooming, etc.

It is another object of the invention to provide a method of recording multiple data sets on a single printed medium wherein the individual data sets may be selectively retrieved.

It is a further object of the invention to provide a method of recording information on a printed medium that can be accurately registered and retrieved without the need of a border or null space.

Additional objects, advantages, and novel features of the invention will be set forth in part in the description that follows, and in part, will become apparent to those skilled in the art upon examination of the following, or may be learned by practice of the invention.

One aspect of the invention is a novel method of recording and visually retrieving user data in a format similar to a conventional two-dimensional barcode. Unlike conventional barcodes, however, user data is spread across the barcode so that the all data can be retrieved even if a significant fraction or majority, i.e., in excess of approximately 50% and up to approximately 80%, of the image is occluded or obscured.

Various methods are available for distributing user data, generally represented as an array of bits, across an image. In one method, each bit individually or in groups is redundantly permuted and repeated at a large number of locations distributed throughout an array of values that will describe the barcode image. The barcode image is then formed, e.g., by printing the image array using a monochrome, grayscale, or color look-up table to transform the values of the image array to pixel tones. The sequence of locations of the bits and the nature of the permutation at each repetition must be known by the reader to recover the user data from the barcode image.

The permutations and location sequences can be generated algorithmically and pseudo-randomly. The locations of bits within the array can be unique, i.e., no two bits are encoded at the same array location, or non-unique, i.e., bits can be superimposed. Multiple data sets can be superimposed on the same image using different location and permutation sequences. Each data set can only be recovered if the precise location and permutation sequences are known. By crafting the permutation and location sequence algorithm, the barcode can be given a signature texture that is substantially independent of the data that is encoded.

Moreover, a known pattern of bits can be interspersed, pre-appended, or appended to the user data to provide a signature pattern. The utilities of these signatures will be described later. The data-modulation methodology is analogous to "frequency hopping" data transception in spread-spectrum wireless communications.

In one methodology for forming the barcode that is analogous to "direct-sequence" spread-spectrum data transception, the barcode is produced by first encoding the user data into a spatial representation, referred to herein as an "encoded user data array," and then modulating this encoded user data array into a modulated data array image using a pseudo-random carrier called a "modulating kernel." The modulated data array is then formatted and printed onto a printing medium as a barcode. As in conventional spread-spectrum optical encoding and serial communications, multiple data sets can be multiplexed without interference on the same data channel (barcode image) by the use of uncorrelated modulation kernels. See for example, Yamazaki et al. (2001), "Optimization of encrypted holograms in optical security systems," Opt. Eng. 40(1):132–137; Refregier et al. (1995), "Optical image encryption based on input plane and Fourier plane random encoding," Opt. Lett. 90:767–769; Javidi, B. (1997), "Securing information with optical technologies," Phys. Today 50:27–32; Yang et al. (1996), "Practical image encryption scheme by real-valued data," Opt. Eng. 35:2473–2478; Javidi et al. (1996), "Experimental demonstration of the random phase encoding technique for image encryption and security verification," Opt. Eng. 35:2506–2512; Unnikrishnan et al. (2000), "Double random fractional Fourier-domain encoding for optical security," Opt. Eng. 39:2853–2859; and Nomura et al. (2000), "Optical encryption using a joint transform correlator architecture," Opt. Eng. 39:2031–2035. The modulated data may only be recovered using the demodulating kernel that is related to the specific modulating kernel that was used to modulate the data set. Thus, multiple sets of user data may be multiplexed onto a single barcode image using uncorrelated modulating and demodulating kernels, allowing secure, covert, individualized, and/or hierarchical access to the user data sets. The user data is recovered from a barcode image by first demodulating the barcode to obtain the encoded data array, and then decoding this array.

This storage and retrieval method is greatly facilitated by the precise registration of the barcode image and the encoding kernel. In one embodiment of the method of the invention, registration is facilitated by simultaneously distributing two types of fiducial information across the barcode image. The first type of distributed fiduciary is a signature texture. This signature texture is recognized by the barcode reader, which infers from distortions in the signature texture an initial estimate of a transform that can map the scanned barcode image into a coarsely corrected image that is free of rotation, tilt, perspective, curvature, and warp. The transform will generally not be derived and applied to the entire barcode at one time, but rather, will be focused on discrete subimages (subsets of the entire image) with each subset being corrected in sequence. While the signature texture provides information regarding rotation, tilt, etc, of each subimage, it does not provide information regarding the physical translation of the individual subimages or resolve a 180-degree rotation ambiguity.

The second type of distributed fiduciary is a signature pseudo-random or deterministic image pattern signature that the barcode reader locates in each of the coarsely corrected subimages. The signature pattern provides translational registration and resolves the rotation ambiguity, thereby completing coarse image registration. Moreover, this signature pattern can be used to enhance the registration accuracy via processing analogous to a two-dimensional phase-locked loop.

Techniques for producing the signature texture include superimposing a "texture carrier" image having the desired texture onto the data-bearing barcode image and crafting the spatial encoding of the user data so that the data-bearing barcode image texture substantially matches a signature texture regardless of the actual data. Similarly, techniques for producing the signature pattern include superimposing a "pattern carrier" image having the desired pattern onto the data-bearing barcode image and crafting the encoding of the user data so that the data-bearing barcode image pattern substantially matches a signature pattern regardless of the actual user data.

Any combination of the above signature-producing techniques may be employed to facilitate barcode reading. The superimposition of fiducial data onto the data bearing barcode provides a robust way of ensuring a texture or pattern is present and the same superimposed image can function as the texture and the pattern carrier. While the superimposition technique allows for virtually any data-encoding scheme to be used, it may limit user-data capacity, as there is an additive loss in capacity when images are superimposed on the data-bearing barcode.

The crafting of the data-encoding scheme to produce a texture or pattern has the advantage of not significantly affecting user data capacity, but may be affected by the type of user data encoded. For example, a crafted encoding scheme that produces the desired texture when random user data are encoded may fail when highly ordered data are encoded, e.g., a long string of repeated characters. Fortunately, the problems inherent in either technique can be identified when the user data are encoded and appropriate measures taken. Methods of modifying the user data to improve the characteristics of the encoded data include, for example, compressing the user data to improve data capacity or appending or interspersing non-user data to remove repetitive data sequences.

DETAILED DESCRIPTION OF THE INVENTION

I. Definitions and Overview

Before describing the present invention in detail, it is to be understood that this invention is not limited to specific encoding schemes, modulation kernels, printing methods, or materials, as such may vary. It is also to be understood that the terminology used herein is for the purpose of describing particular embodiments only, and is not intended to be limiting.

It must be noted that, as used in this specification and the appended claims, the singular forms "a," "an," and "the" include plural referents unless the context clearly dictates otherwise. Thus, for example, reference to a "glyph," includes both multiple and single glyphs.

In describing and claiming the present invention, the following terminology will be used in accordance with the definitions set out below.

The expressions "encoded user data array" or "user data array" refer to a spatially encoded array of user data and are used interchangeably.

The term "modulating kernel" refers to a two-dimensional pseudo-random carrier.

The term "signature fiduciary" refers to the registration information embedded in the barcode that is used to correct the scanned image. The term "signature texture" refers to the aspect of the signature fiduciary that allows for correction of distortions caused by rotation, tilt, perspective, curvature, and warp.

The term "signature pattern" refers to the aspect of the signature fiduciary that allows for translational registration of individual subsections that have been corrected using transforms constructed from the signature texture.

While the method of the invention is set out in detail below with specific reference to certain embodiments, it is to be understood that there is no intent to limit the method to the specific embodiments discussed. The intent is rather to cover all alternatives, modifications, and equivalents falling within the spirit and scope of the invention as defined by the appended claims.

In the method of the invention, user data are modulated in a distributed fashion across a data bearing barcode image so that each pixel of image, on average, contains an equal fraction of all the encoded information. Spatial averaging of this information is required to obtain a signal to noise ratio (SNR) high enough for decoding the information. Thus, user data are recoverable provided enough of the barcode is visible to obtain a usable SNR.

In one embodiment, each bit or cluster of bits of the user data is permutated and repeated at a long (e.g., greater than sixteen) sequence of locations within the image array. The permutation and location sequence can be derived algorithmically and from a pseudo-random code. This direct means of modulating the user data provides for creating a signature texture by appropriately crafting the permutation and location sequence. Moreover, appropriately pre-appending, interspersing, or appending bits to the user data can create the signature texture.

Figure 1A:
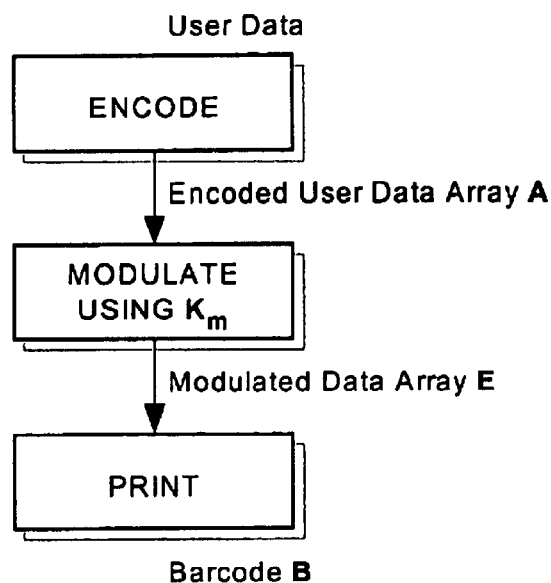
FIGS. 1(a) and (b) are block diagrams of the method of the invention.
Figure 1B:
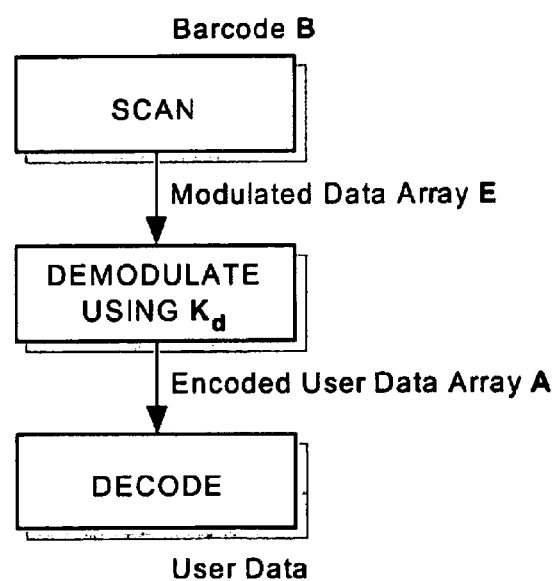

In an alternate embodiment, a direct-sequence, spread-spectrum modulation technique is used to distribute the information. This technique is implemented by convolving a pseudo-random "modulation kernel" $K_m$ with a discrete spatial encoding of user data (similar to a conventional two-dimensional barcode). In this embodiment, convolving the resulting barcode image with a kernel related to the kernel used in the modulation will demodulate the spatially encoded data. User data are then decoded from the spatial representation using standard techniques. A diagram of the method of the invention is presented in FIGS. 1(a) and (b).

Figure 2A:
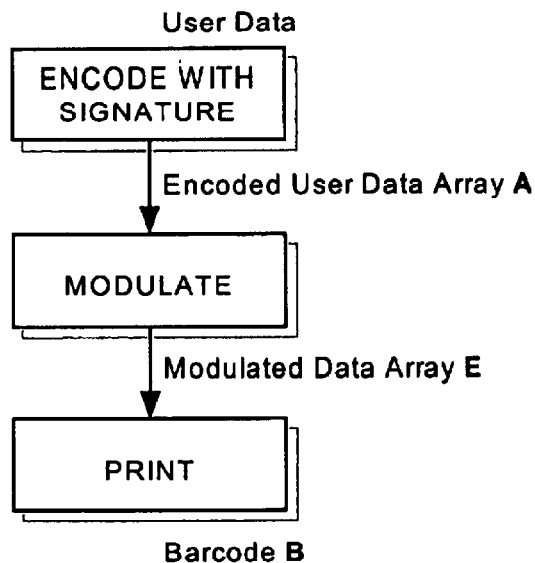
FIGS. 2(a) and (b) are block diagrams of an embodiment of the claimed method wherein signature data is crafted into the encoded user data.
Figure 2B:
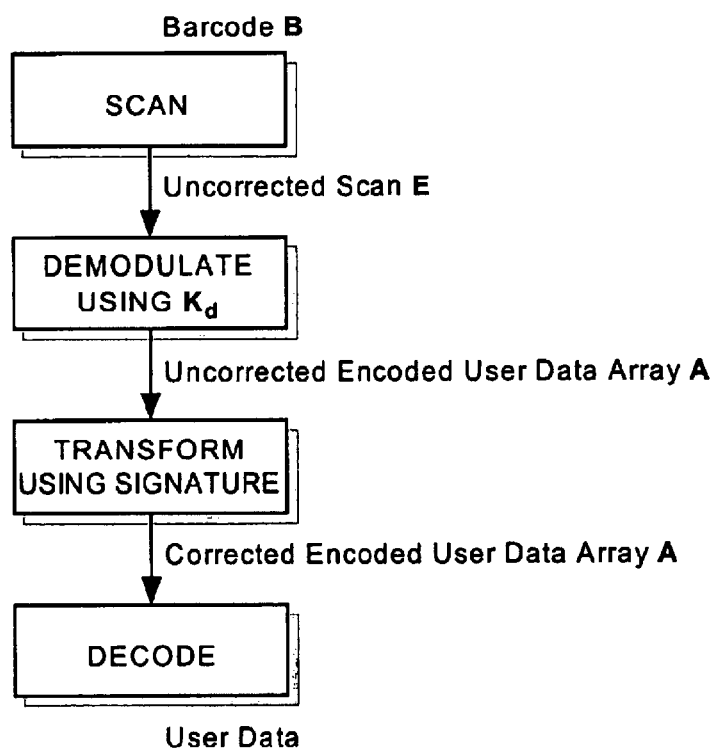

In the method of the invention, fiducial data are modulated in a distributed fashion across a barcode image so that each pixel of image, on average, contains an equal fraction of fiducial information. These distributed fiduciaries facilitate image registration, the precise determination of the position and arrangement of the barcode image, an integral step of the demodulation procedure that is poorly accommodated using current registration methods. In a preferred embodiment of the distributed fiduciary, the barcode reader recognizes two signature characteristics of the barcode image: a signature "texture" and a signature "pattern." These signatures are known by the barcode reader and are present regardless of the contents of user data sets contained in the barcode. A diagram wherein registration information has been incorporated in the barcode image is presented in FIGS. 2(a) and (b).

The signature texture contains cues to the local tilt, perspective, and magnification of the barcode image. In a preferred embodiment, this texture is quantified by two-dimensional autocorrelation of subimages of the full barcode image, which can be performed rapidly by the use of fast Fourier transforms. The location of the features (e.g., peaks and dips) used in the autocorrelation provides measurements of tilt, zoom, and perspective of the subimage. These local measurements are then used to infer high-order image defects like warping and curvature. The relative intensity of peaks and dips in this correlation also allows non-uniform illumination to be normalized. The signature texture thus facilitates the measurement of all imaging defects except translation and a 180-degree ambiguity in rotation angle.

The signature pattern facilitates the measurement of image translation and resolution of the rotational ambiguity. In a preferred embodiment, the location of each subimage with respect to a known pattern is obtained by correcting each subimage (e.g., bilinearly) for magnification, tilt, perspective, and rotation, based upon the texture measurements. This corrected subimage is then cross-correlated with the known pattern. If the angular ambiguity has not been resolved by other means, e.g., continuity of the barcode image, the corrected subimage is then rotated 180 degrees and cross-correlated with the known pattern. The properly orientated subimage has the highest cross-correlation peak. The location of the peak correlation provides the relative translation of the subimage with respect to the known pattern. The corrected subimages are then combined in the proper location into a complete registered version of the image.

If needed, the image registration can be more elaborate and iterative. For example, parameters of a spline or other mathematical representation of the barcode surface can be initially estimated using this methodology and then refined iteratively by maximizing the correlation coefficient of the barcode image and pattern. This computationally burdensome procedure may be useful in cases where it is critical to recover the data from a badly damaged or distorted barcode and the simpler processing fails, or where other reasons exist for wanting a precision measurement of the barcoded surface, as will be discussed below.

The barcode can be given signature texture and patterns by a range of means, including:

1. superimposing an image having the desired texture or pattern or both on the data-bearing barcode image, or
2. encoding the user data in a special form that imparts a close approximation of the desired texture or pattern or both on the barcode image regardless of the actual user data.

Any combination of these techniques can be employed to produce the signatures. For example a "texture signature" and a "pattern signature" can be independently superimposed on the data-bearing barcode.

Figure 3A:
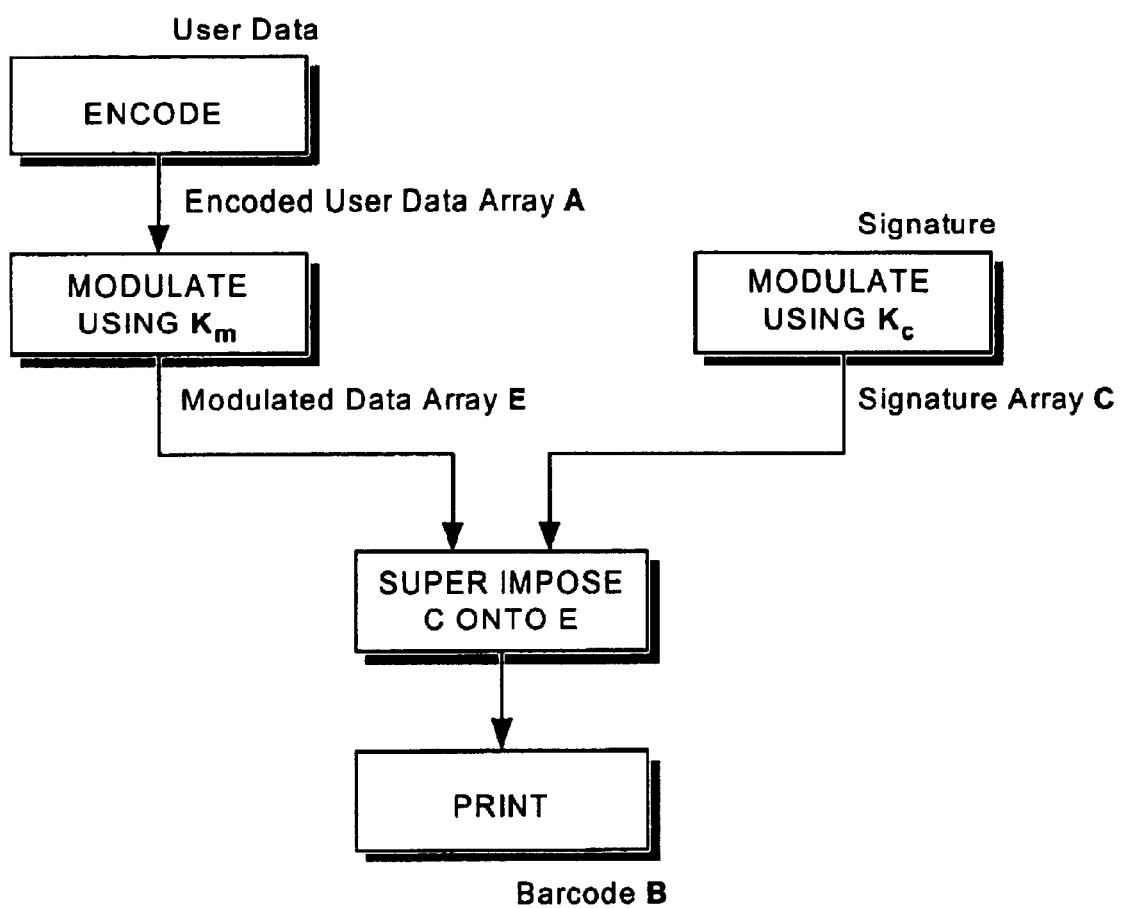
FIGS. 3(a) and (b) are block diagrams of an embodiment of the claimed method wherein signature data is superimposed on the user data.
Figure 3B:
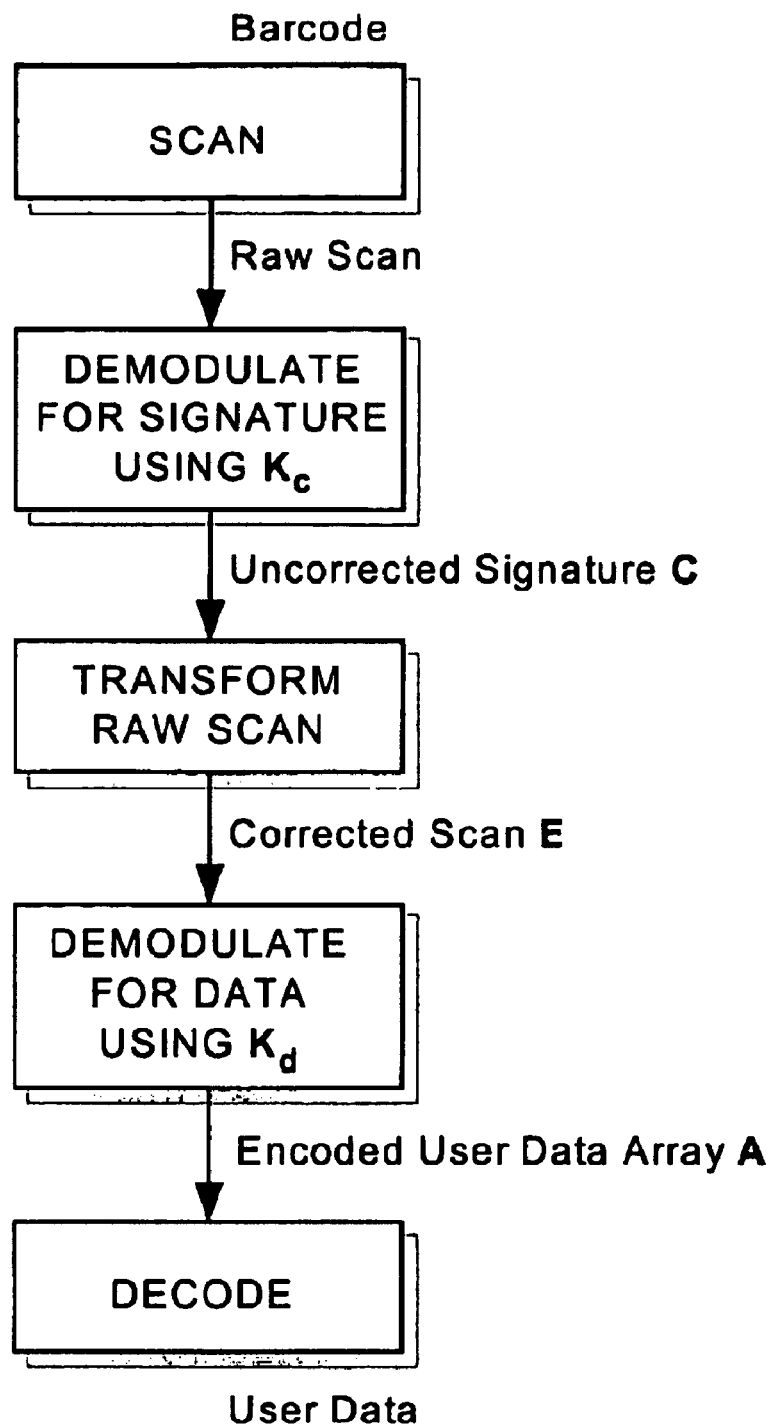

A preferred embodiment shown in FIGS. 3 (a) and (b) uses the superimposition of a combination "texture/pattern signature" on a general data-bearing barcode. This embodiment has the advantage of allowing virtually any data-encoding scheme to be used, while avoiding the additive loss in user data capacity caused by superimposing two independent carriers.

An alternative preferred embodiment is the use of a specific encoding methodology to ensure that the signature texture is approximated, regardless of the contents of the user data. The data-bearing image is then superimposed with a relatively weak pattern signature, thereby minimizing the loss in user data capacity. The principal disadvantages of this embodiment are that only special user data encoding methods can be employed and that the fidelity to the signature of the actual texture may depend on the contents of the user data. That is, an encoding methodology that produces a good match to the signature for random data may produce a poor match for highly ordered data like a long string of repeated characters. Fortunately the actual and signature textures can be compared while the barcode is being generated and corrective steps taken, including, but not limited to:

1. compressing the user data and thereby increasing the apparent data disorder and possibly increasing data capacity;
2. pre-encoding digitally the user data before the spatial encoding to produce a better match to the signature texture. (This procedure will slightly reduce data capacity, since the method of pre-encoding will need to be indexed or otherwise indicated in the barcode data); and
3. pre-appending, appending or interspersing non-user data within the user data to improve the match between the actual and signature texture, directly reducing user data capacity.

In another preferred embodiment, multiple sets of user data may be encoded on to the same barcode by superimposing a second set of user data that has been modulated with a different encoding kernel.

II. Spatial Encoding and Decoding of User Data

The steps of encoding and modulating the user data are not necessarily distinct and these functions can be performed simultaneously. For example, as described earlier, data bits may be redundantly encoded at a pseudo-random sequence of locations within the image. However, a preferred embodiment of the spread-spectrum barcode utilizes a two-step procedure wherein the user data are first spatially encoded into an encoded data array, A, as a sequence of glyphs and is then modulated to spread the encoded data redundantly across the barcode. Reading of the barcode proceeds by demodulation of the spread-modulated data, followed by decoding of the demodulated encoded data. An algorithm for data encoding and decoding is called a codec. This section describes preferred spatial codecs for encoding and decoding user data either with or without the inclusion of a signature texture and/or signature pattern.

Optimal codec selection is highly dependent upon the intended data detection or storage method. If the data are to be stored electronically, a codec that supports rapid automated processing, error correction, and error detection is desirable. If the data are simply to be viewed by a user, they could be encoded into a human readable format using a font. Data representing an image could be encoded verbatim and also decoded visually. Suitable codecs are well known in the art and would be readily apparent to one who is skilled in the art.

One example of a codec that facilitates electronic storage of the recovered data is presented as follows. Eight-bit words are utilized in the embodiment discussed below. It will be appreciated that this data type choice is for purposes of example only, and that other data types may be used. The methodology disclosed herein can be extended without substantial modification to data units of arbitrary size. The goal of the encoding procedure is to produce a glyph that unambiguously represents the data word, provides for error detection and correction, and, regardless of the data word, has the minimum deviation from a target autocorrelation. The target is defined either by the signature texture or the desired spatial spectrum of the autocorrelation, e.g., white noise, pink noise with a low-frequency cutoff, etc. Error detection and correction are required for reliable and secure data transmission and the ability to correct for at least one or two bit errors is preferable. Minimization of deviation from the target autocorrelation insures that the encoded data produce minimal errors in the texture signature and that the decoding is relatively immune to interference.

Figure 4:
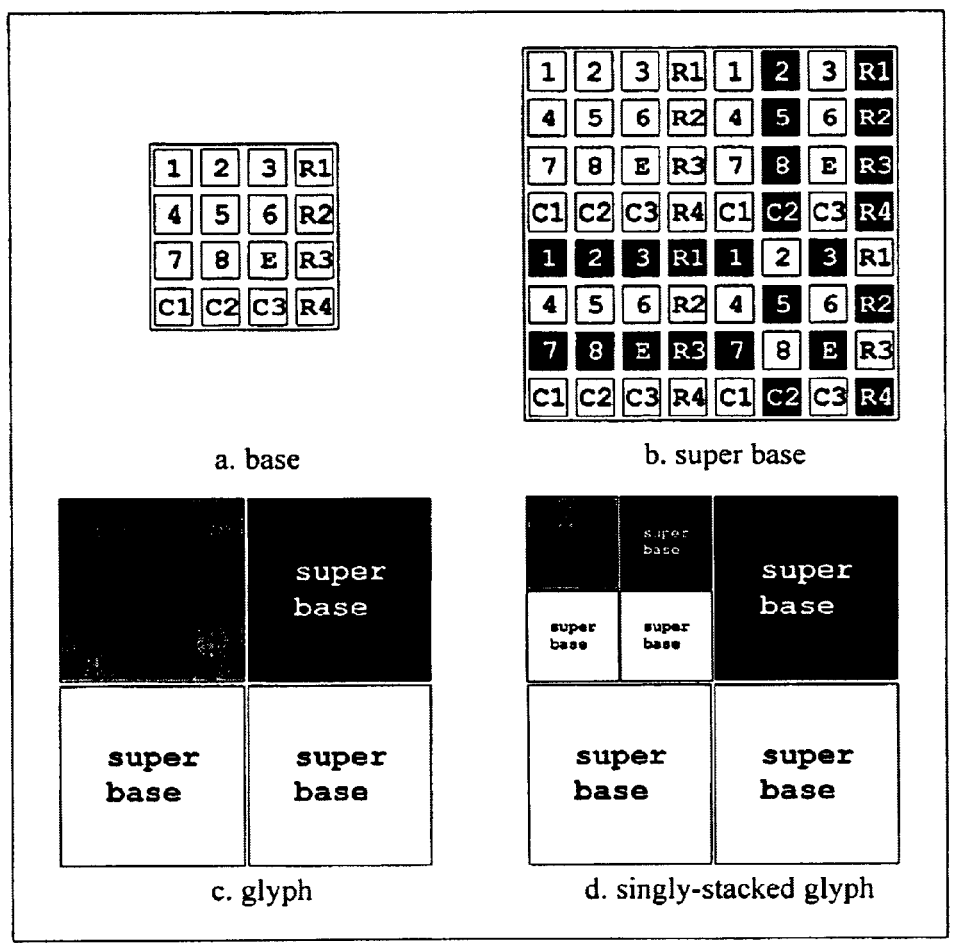
FIGS. 4(a), (b), (c), and (d) are diagrams of sample encoding methodology. In the base (a), blocks labeled with numbers represent data bits; blocks R1–R4 and C1–C3 are, respectively, row-wise and column-wise parity bits, and block E the parity of the data byte. In the superbase (b), black blocks represent inverted bits. The superbase consists of four permutated copies of the base. The glyph (c) consists of two positive copies of the superbase and a negative (inverted) copy. This arrangement produces the signature texture. Glyphs can be scaled and stacked (d) to spread the spatial spectrum of the data further.

Suitable glyphs can be constructed in a variety of ways. In one embodiment, codecs utilize glyphs constructed from a base representation of an eight-bit word or data unit. The base consists of a block of pixels that include the eight bits of the word or data unit and eight additional bits for error detection and correction, and possibly, spectrum homogenization. After the encoded and modulated barcode is demodulated, the base is reconstructed from a glyph and, if needed, error correction applied to recover the data word. One type of base consists of a 4×4 array containing eight data bits, eight error-correction bits. No homogenization bits are included. Another embodiment uses a 3×3 array containing eight data bits and one parity bit. The 4×4 basis is shown diagrammatically in FIG. 4(a).

Glyphs are constructed from a base in a variety of ways depending on the method chosen to generate the signature texture and pattern. If the encoding method is not used to produce the signature, glyphs can be as simple as a single copy of the basis. The peak autocorrelation and spatial spectrum that result from such simple glyphs typically differ significantly for each character represented. These differences may cause data words to differ undesirably in response to interference encountered during decoding. Also, the average spatial spectrum of the simple glyph encoded data appears in the spatial spectrum and thus, the texture of the barcode. As a result, the texture of the barcode can be significantly affected by the contents of the user data, necessitating compensation by the superposition of a relatively strong texture signature with an accompanying loss in user data capacity.

Alternatively, and preferably, glyphs can be constructed from the base with repetition and permutation to broaden and homogenize the spectrum of each glyph. As mentioned above, a goal of homogenization is to produce a pattern for all characters that has a minimum deviation from the target autocorrelation. The optimization of this construction is a therefore two-dimensional extension of the classical optimal coding problem. Optimization can be performed by computerized search or optimal coding theory (c.f., Golay codes). Although non-optimal, an alternative approach that represents a significant improvement over a simple copy of the base is the formation of a superbase composed of a copy of the base in one corner, a copy of the base with alternating rows of bits inverted in another corner, a copy of the base with alternating columns of bits inverted in another corner, and a copy of the base with alternating rows and columns of bits inverted in the remaining corner. An example of such a superbase using the 4×4 base of FIG. 4(a) is shown in FIG. 4(b).

In a preferred embodiment, wherein the signature texture is generated by the encoding method, the superbase discussed above is repeated in a 2×2 pattern (as shown in FIG. 4(c)) wherein each copy of the superbase is multiplied by a coefficient. These coefficients form a 2×2 matrix. Preferred matrices are (1) and (2) below:

$$\begin{bmatrix} -1 & -1 \\ 1 & 1 \end{bmatrix}, \text{and} \quad (1)$$

$$\begin{bmatrix} 0 & -1 \\ 1 & 1 \end{bmatrix}. \quad (2)$$

Glyphs constructed from either matrix (1) or matrix (2) contain a signature pattern comprised of an autocorrelation peak in the row-wise direction at a distance equal to the superbasis width, and a dip in the column-wise direction at a distance equal to the superbase height. These glyphs thus produce a useful pattern for registration purposes and have a useful texture by construction.

Figure 5:
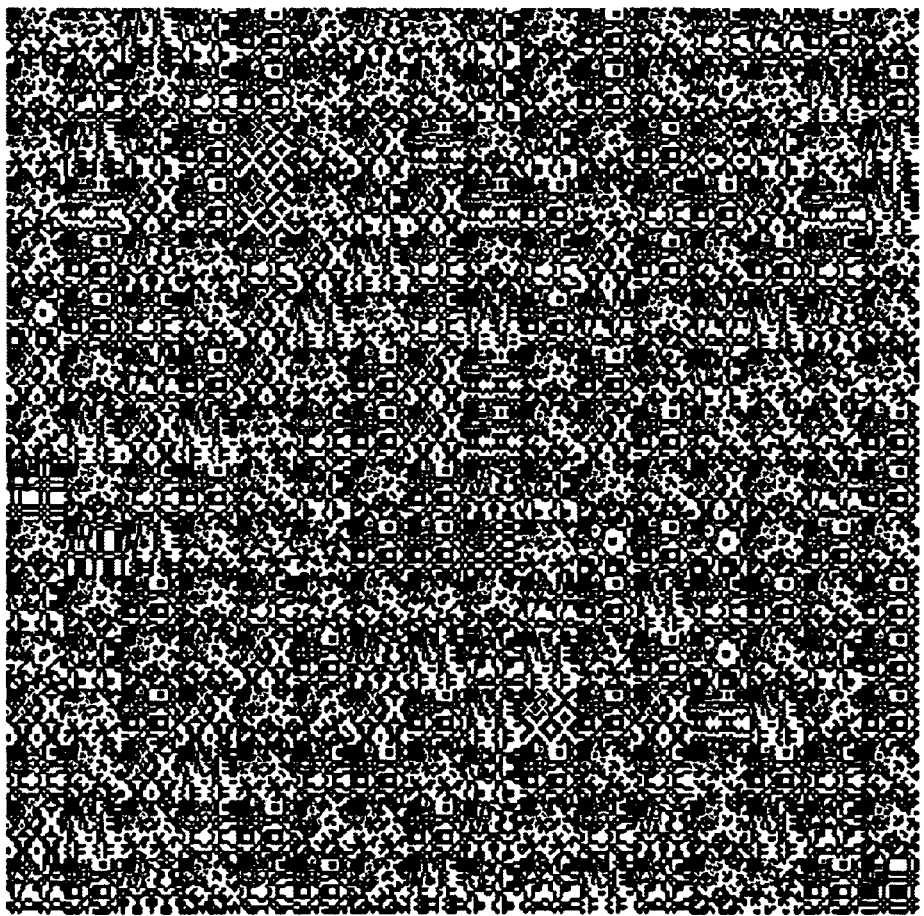
FIG. 5 shows the first 256 bytes of Lincoln's Gettysburg address encoded using singly stacked glyphs.

Glyphs constructed using matrix (2) can be binarily scaled and stacked without overlap when it is desired to spread the spectrum of the encoded data to higher or lower frequencies. An example of stacking appears in FIG. 4 (d). The resulting spectrum has an approximate pink noise frequency roll off above the size of the largest glyph in the stack. FIG. 5 shows a sample message encoded using singly stacked glyphs.

To decode glyphs that are encoded as described above, gray scale measurements of the superbases are recovered from the measured glyphs, and gray scale measurements of the bases are obtained from the superbases. Bits of the base are recovered by thresholding the grayscales. Error correction is applied to these bits. If the error correction is indeterminate (for example, if multiple irresolvable bit errors exist) the deviation of the grayscale base values from the threshold can be used to assess which bits are the most likely to be invalid.

III. Spread-spectrum Modulation and Demodulation

Figure 6:
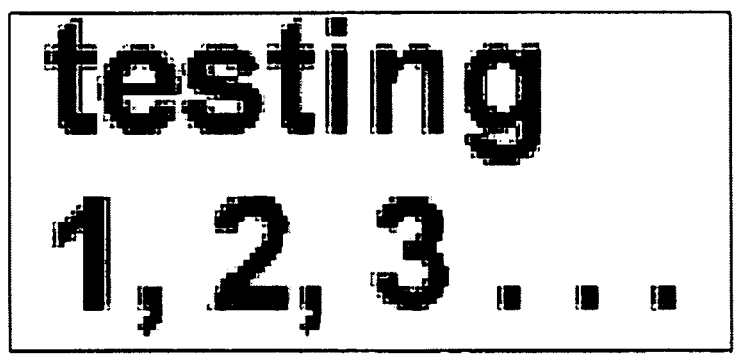
FIG. 6 shows three different conventional localized modulations of the data, "testing 1, 2, 3 . . . "
Figure 6:
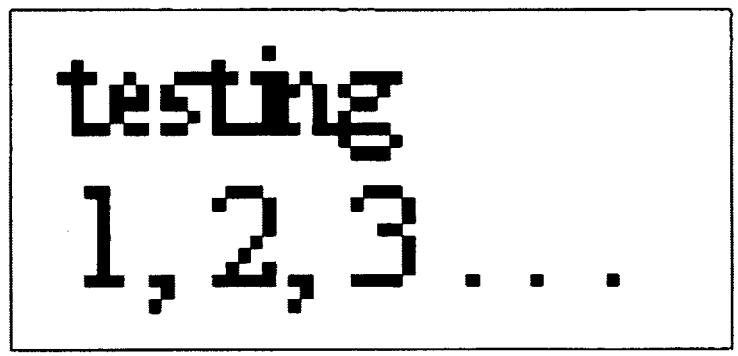
Figure 6:
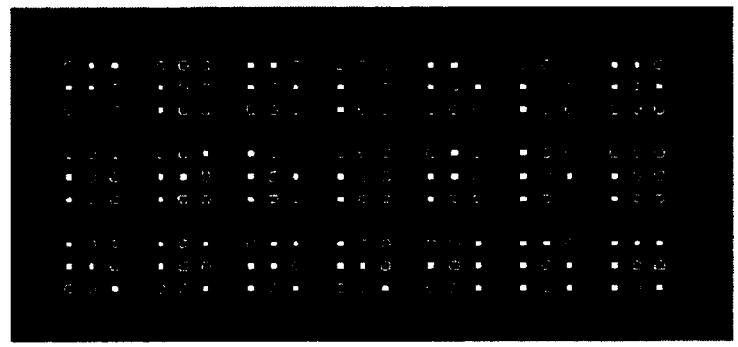
Figure 7:
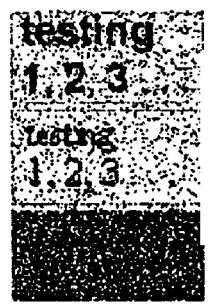
FIG. 7 illustrates how Gaussian noise superimposed on the modulations presented in FIG. 4 degrades the recovery of the data. The top encoding, being the most redundant degrades the least. The center modulation is barely readable. The bottom modulation is not readable at all.
Figure 8:
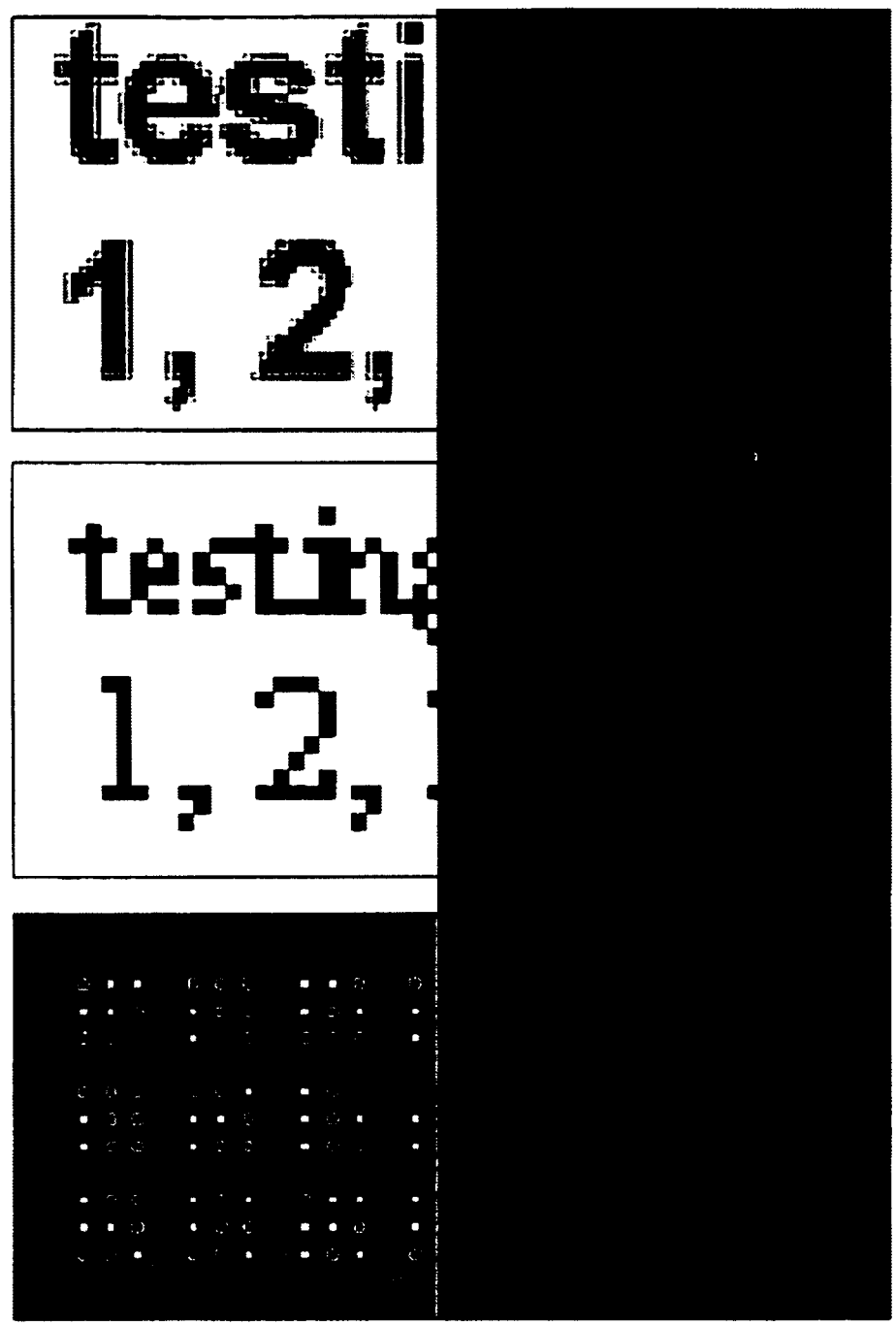
FIG. 8 shows how occlusion of the modulations presented in FIG. 4 renders the data unrecoverable because of data localization.

Normally, barcodes are constructed so that a bit of information is localized to one or a few discrete locations within A; or, several bits are grouped into a glyph that spans a limited range within A, as discussed above. FIG. 6 shows three "conventional" ways of invertibly encoding and placing the data "testing 1, 2, 3 . . . " in an array. The top and middle methods use recognizable glyphs. The top method uses more pixels and levels of gray to represent the data than does the middle encoding method, while the method utilized in the bottom of FIG. 6 represents each bit of a byte by a dark or light pixel against a gray background with each byte arranged in a 3×3 base. In the third method, a parity bit is also included for single-bit error detection. A wide variety of alternative encoding methods are available, e.g., the encoding just described, Aztec Code, Data Matrix, Data Strip Code, MaxiCode, PDF 417, Micro-PDF 417, QR Code and the like. Other encoding methods will be well known to those of skill in the art. Each encoding method offers different levels of convenience, data density, and error correction, but in all of the prior barcoding methods, the encoded data are recorded in a localized fashion as in FIG. 6. If part of the barcode is corrupted by noise, damage, or blockage, the data may not be recoverable. For example, FIG. 7 shows the effect of Gaussian noise on the legibility of the data in FIG. 6. FIG. 8 shows the effect of occlusion on the data in FIG. 6.

Figure 9:
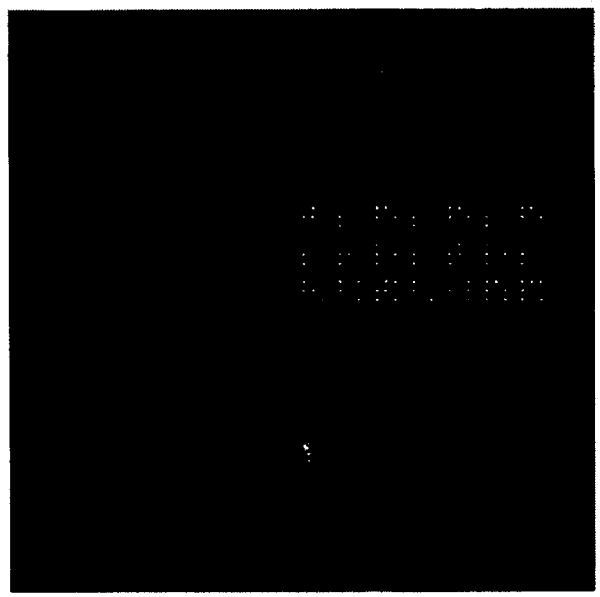
FIG. 9 shows the spatially encoded data of the bottom modulation of FIG. 6.

The spread-spectrum modulation employed in this novel methodology mitigates the effects of occlusion and noise on the readability of the barcode by distributing the encoded data across the barcode rather than localizing it in glyphs. A simple approach to distributing the data is to first form a encoded data array A using a standard encoding method, and then to convolve A with a two-dimensional pseudo-random modulating kernel, $K_m$. For example, FIG. 9 shows the data "testing 1, 2, 3 . . . " as in the bottom of FIG. 4. This image is then convolved with the two-dimensional pseudo-random kernel shown in FIG. 10 and overlaid with a signature pattern and texture to obtain the barcode image in FIG. 11.

Demodulation of the barcode proceeds by convolving the image with a demodulation kernel, $K_d$. The kernels $K_m$ and $K_d$ are related to each other. If the modulation/demodulation (modem) scheme is conservative and therefore recovers data exactly in the absence of noise, $K_d$ is the inverse of $K_m$. Non-conservative modem schemes may provide more robust data recovery in the presence of noise and interference. A convenient implementation of such a scheme sets kernel $K_d$ to the transpose of $K_m$.

Figure 10:
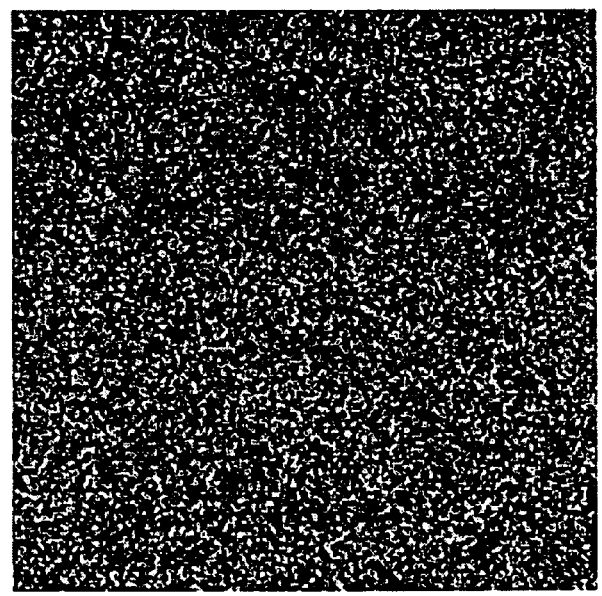
FIG. 10 illustrates a random number modulating kernel.
Figure 11:
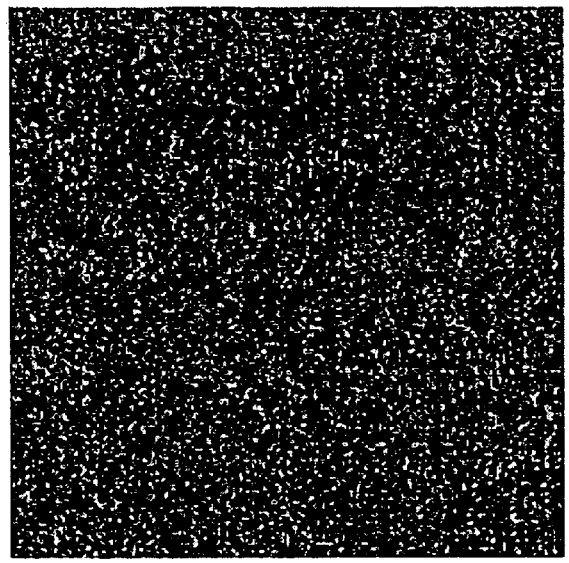
FIG. 11 illustrates the barcode obtained by convolving the data of FIG. 9 with the kernel of FIG. 10 and then superimposing signature array C.

The kernel shown in FIG. 10 is a "random-number" kernel, produced by first filling an array with numbers from a random number generator, then spatially filtering the array to reduce rapid variations in the grayscale, i.e., high-spatial frequencies. Each (complex) value in the spatial Fourier transform of a "random-number" kernel exhibits a random phase and a random amplitude. When noise and interference are present in the barcode image, random-number kernels perform worse than "random-phase" kernels, whose Fourier transforms have a random phase, but a deterministic variation in amplitude with spatial frequency (e.g., uniform). Spectral bands of the kernel having relatively low amplitude are de-emphasized in the barcode image. If the modem scheme is conservative, these bands are re-emphasized by demodulating with the kernel inverse, increasing the sensitivity to noise in these bands.

A random-phase kernel can provide optimal accuracy in the conservative recovery of data from noisy signals, as the spectral response can be tailored to emphasize a band in proportion to the expected noise spectrum of the band. On demodulation with the inverse of the kernel, the noise is optimally de-emphasized. If the noise spectrum is expected to be uniform or unknown and the data to be modulated has a uniform spectrum, an optimal conservative random-phase modulating kernel has a uniform spectral amplitude. The demodulation kernel (and inverse of the modulating kernel) is simply the transpose of the modulating kernel.

The modulation and demodulation scheme that most robustly recovers user data in the presence of noise and interference may be nonconservative. Thus, optimal pairs of modulating and demodulating kernels are not necessarily inverses of each other. Data encoded with both random-phase and random-number kernels may be nonconservatively demodulated by the use of demodulating kernels that are the transpose, but generally not the inverse of the modulating kernel. This procedure demonstrably improves the noise immunity of random-number-based modem schemes and may also improve random-phase-based modem schemes when specific interferences or noise is expected.

In one embodiment of the invention, encoded user data are modulated by cyclic convolutions (denoted by ) performed using the Fourier convolution theorem and fast Fourier transforms, such that modulation is accomplished by calculating $$E \equiv K_m oA = FT^{-1}\{(FT\{K_m\})^* FT\{A\}\} \quad (4)$$

where E is the modulated data array, FT and $FT^1$ are the Fourier transform and inverse Fourier transform operators, respectively, and * denotes complex conjugation. The barcode array B is then the sum of E and the product of a modulated signature array C and the "carrier ratio" coefficient γ which represent the desired ratio of signature content to user data content. Thus, when the carrier ratio is 1, the user data content and signature content are equally represented in the resulting barcode array. When the carrier ratio is 0.25, the signature array represents only 25% of the content of the user data array in the barcode array. The choice of carrier ratio will vary with the intended use of the resulting barcode array. When the barcode must contain large quantities of user data, carrier ratios of approximately 0.0625 to approximately 1 may be used with a ratio ranging from approximately 0.1 to approximately 0.5 being preferred. In applications where the recovery of the signature array is paramount, as will be discussed below, carrier ratios ranging from approximately 1 to approximately 16 may be used, with carrier ratios ranging from approximately 2 to approximately 4 being preferred.

Figure 12:
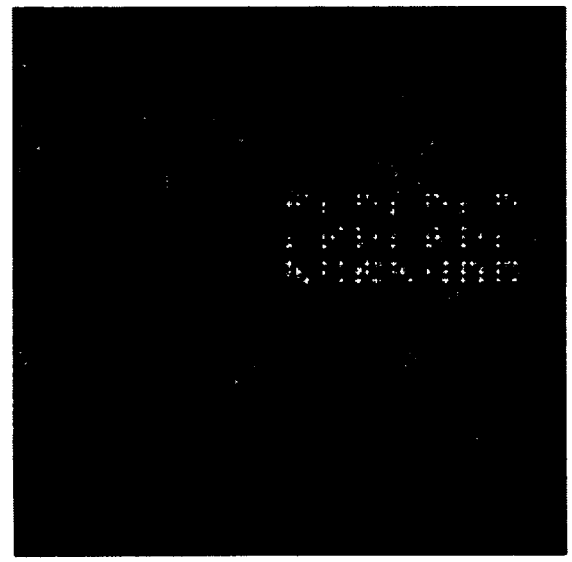
FIG. 12 presents data demodulated nonconservatively by convolving the barcode of FIG. 11 with the demodulating kernel $K_m^T$.

The encoded data array A may be recovered from a registered image of B via cyclic convolution with the demodulation kernel $K_d$. This process can be understood by noting that convolution is closely related to correlation. The convolution of two correlated random arrays contains peaks that scale linearly with the size of the array, N, which is the product of the number of rows and columns in the array. The peaks in the convolution of two uncorrelated random arrays scale with the square root of the size of the array. Thus the convolution of two uncorrelated arrays is subdominant to the convolution of two correlated arrays, provided the array is sufficiently large. Furthermore, the cyclic convolution of demodulating and modulating kernels approximates an identity by construction (or equals an identity if the modem scheme is conservative). The pseudo-random kernels $K_d$ and C are constructed to be uncorrelated, thus $$\|K_d o K_m\| \sim O(N), \|K_d o C\| \sim O(\sqrt{N}). \quad (5)$$

where the symbol O( ) denotes the order of the variation of the term. Consequently, $$K_d oB = K_d o(K_m oA) + K_d o\gamma C \quad (6)$$

$$= (K_d o K_m) oA) + \gamma K_d oC \quad (7)$$

$$\sim A \times O(N) + \gamma R \times O(\sqrt{N}) \quad (8)$$

$$\propto A, \text{ with SNR} \sim \gamma^{-1} O(\sqrt{N}) \quad (9)$$

where R is a random vector having unit norm. Thus the dominant component of the convolution of the pseudo-random demodulating kernel $K_d$ with the barcode array B is the encoded data array A. FIG. 12 shows the result of this operation using the data from FIGS. 9–11.

Figure 13:
FIG. 13 presents demodulated data from a barcode with the same level of Gaussian noise as shown in FIG. 7.
Figure 14:
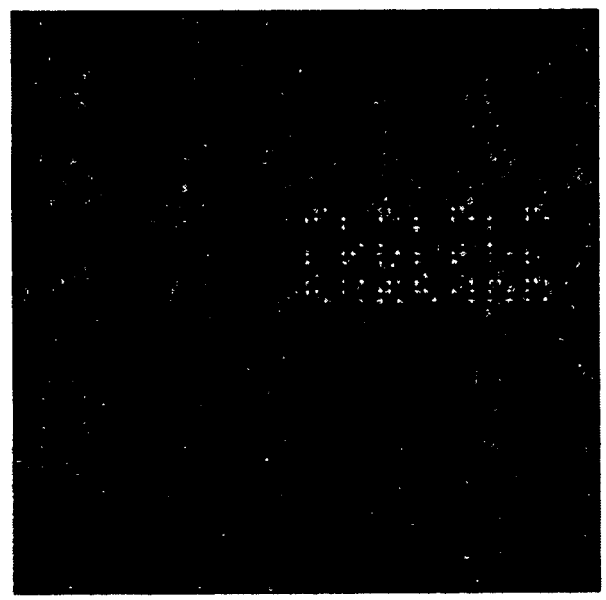
FIG. 14 presents demodulated data from a barcode with the same level of occlusion as shown in FIG. 8.

This methodology is relatively unaffected by incoherent noise, since the correlation peaks from noise are subdominant. FIG. 13 shows the demodulated data when the same noise level as in FIG. 7 is superimposed on the barcode data. This methodology is also relatively unaffected by occlusion of the barcode. FIG. 14 shows the demodulated data when half of the barcode image is blocked, as in FIG. 8. All the data encoded in the barcode are readable, but the SNR of the recovered data is reduced by a factor of ½.

Figure 15:
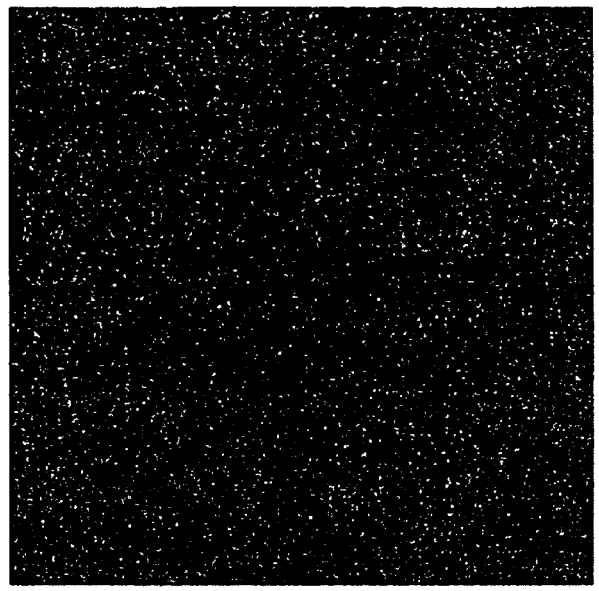
FIG. 15 is a uniform-amplitude, random-phase kernel used to modulate the data encoded as in FIG. 5.
Figure 16:
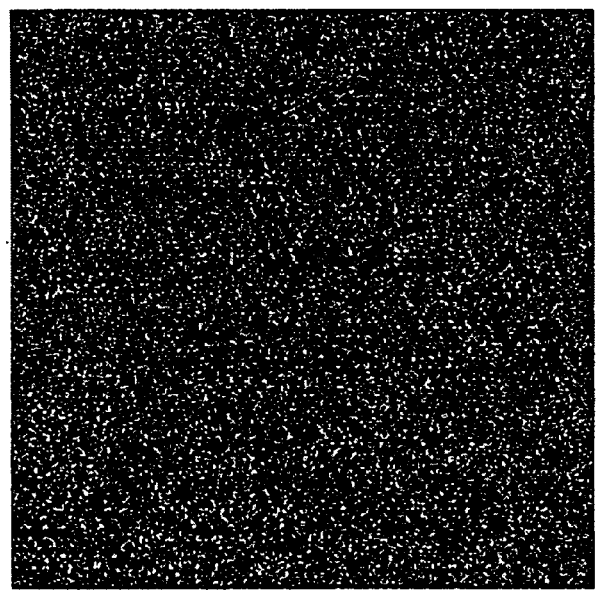
FIG. 16 shows the barcode achieved by modulating the data of FIG. 5 with the kernel of FIG. 15.
Figure 17:
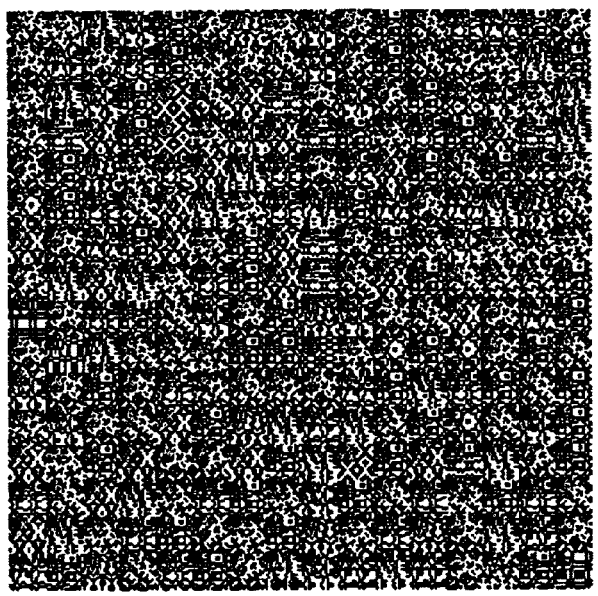
FIG. 17 shows the encoded demodulated data retrieved by demodulating the barcode of FIG. 16.
Figure 18:
FIG. 18 shows the barcode of FIG. 16 with simulated occlusion blur and noise.
Figure 19:
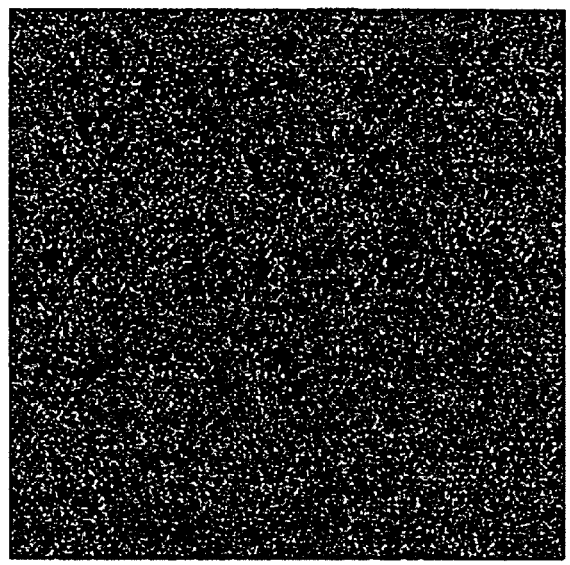
FIG. 19 shows the encoded demodulated data retrieved by demodulating the barcode of FIG. 18. All bytes of the quotation were decoded except one that was detected as erroneous.

FIGS. 15–19 depict the performance of a conservative modem scheme using a uniform-amplitude, random-phase kernel, as shown in FIG. 15. FIG. 16 shows the barcode obtained by modulating the encoded Gettysburg address data in FIG. 4 using the kernel of FIG. 15 and superimposing a signature pattern and texture at a carrier ratio (γ) of 0.25. The encoded data image demodulated from this barcode, shown in FIG. 17 has only slight imperfections arising from the superimposed signature. FIG. 18 shows a simulated damaged barcode with blur and additive noise. While the encoded data demodulated from this barcode, shown in FIG.

19, bears little resemblance to the relatively pristine data of FIG. 17, the analysis software successfully decoded all but a single character in which multiple bit errors were automatically detected. If the additive noise is removed, all characters are successfully demodulated.

Figure 20:
FIG. 20 shows the barcode of FIG. 11 with overlaid text and graphic.
Figure 21:
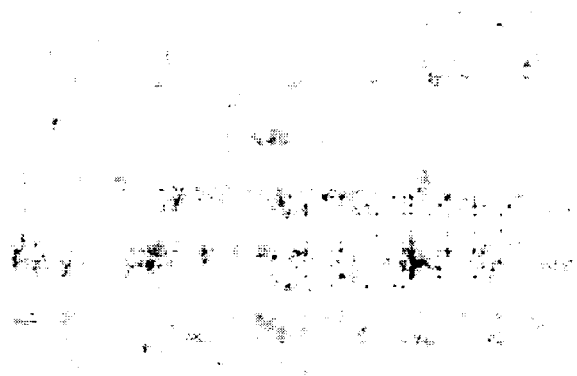
FIG. 21 shows the demodulated encoded data recovered from FIG. 19.
Figure 22:
FIG. 22 illustrates the result of applying a simple thresholding algorithm to the overlaid barcode of FIG. 20.
Figure 23:
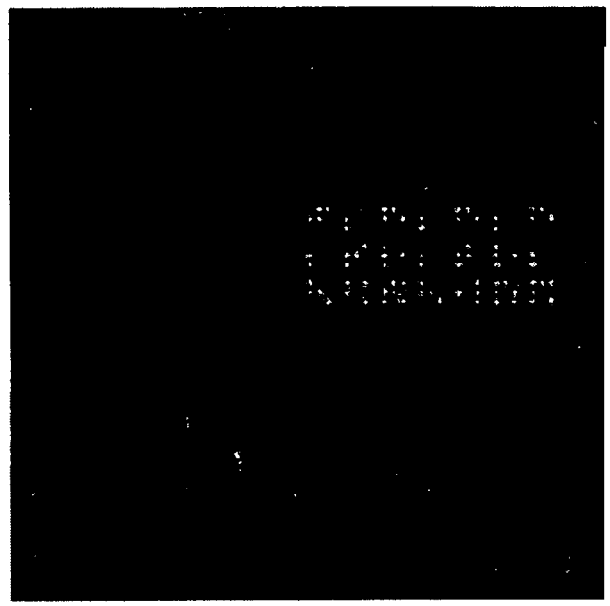
FIG. 23 shows the data demodulated from FIG. 22.

Conventional barcodes typically require a surrounding blank "quiet area" so the barcode can be identified. The spread-spectrum barcode requires no quiet area and can, in fact, be overprinted with text and graphics with little loss in SNR provided that these overlays are distinct from the barcode and can be nulled from the image using thresholding, or similar, techniques. For example, FIG. 20 shows the barcode in FIG. 11 with overlaid text and graphics. FIG. 21 shows the barcode data recovered from this raw image. FIG. 22 shows the result of applying a simple thresholding algorithm to FIG. 20 that replaces the brightest 10% of pixels and the darkest 10% of pixels with the mean pixel value in the image. The data demodulated from the image in FIG. 22 are shown in FIG. 23. This simple thresholding procedure significantly enhances the SNR of the demodulated data. The ability to handle overprinting is unique to the spread-spectrum barcode and facilitates its use on product labels, postal envelopes, etc. The differentiation between the barcode and overprinted material can be by made using intensity, color, or (visual) texture and can be facilitated by color or spatial filters. The technique does not require perfect differentiation between the barcode and overprinted material, as even the barcode data in FIG. 21 is marginally readable, and there is no attempt in the processing to distinguish between the two.

If two incoherent modulation kernels $K_1$ and $K_2$ are used to modulate encoded data arrays $A_1$ and $A_2$, respectively in the barcode, $$K_1 oB = K_1 o(K_1 oA_1) + K_1 o(K_2 oA_2) + K_1 oC \quad (10)$$

$$\sim A_1 \times O(N) + R \times O(\sqrt{N}) \quad (11)$$

$$\propto \alpha A_1, \text{ with SNR} \sim \sqrt{N} \quad (12)$$

Thus, multiple data sets may be multiplexed on the same barcode by the use of different uncorrelated modulation kernels. Demodulation of the barcode image with a given demodulation kernel recovers only the data modulated by the related modulation kernel. The SNR of the recovered data decreases as additional data is overlaid so the amount of overlaid data is limited by the information capacity of the recorded image.

IV. Image Registration Using a Signature Array

As discussed previously, image resolution can be facilitated by crafting the encoding scheme to produce barcodes having recognizable signature fiducial information, and/or by superimposing a signature array C in the form of a pseudo-random code having a recognizable signature texture, F. This section outlines methods with which to create an arbitrary desired signature as well as methods of using the signature to quantify local image distortions.

Figure 24:
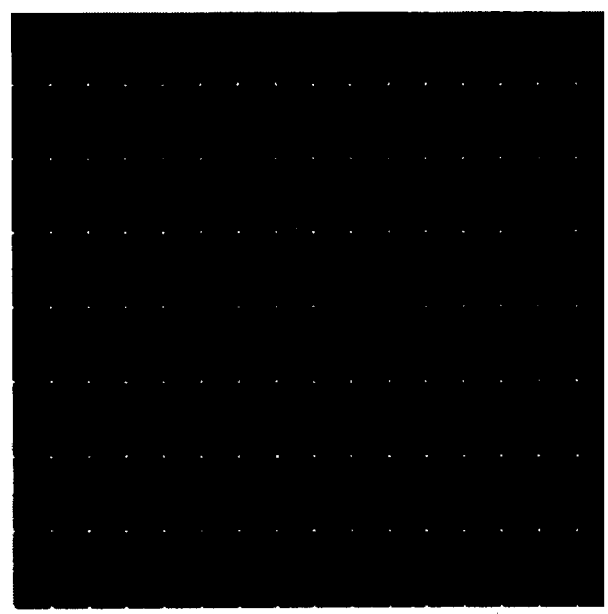
FIG. 24. is a sample of an easily recognizable ideal signature texture.

FIG. 24 shows a sample of an idealized signature texture. The dot distribution is distinctive and supports automated image analysis. An ideal texture array $C_I$ can be constructed having a precisely defined ideal signature texture $F_I$ everywhere except at the origin, provided $F_I$ is self-transpose, i.e., has symmetry through rotations of $\pi$. The ideal texture array $C_I$ is obtained by first taking the Fourier transform of the ideal signature texture, $IF_I FT\{F_I\}$. The resulting array $IF_I$ is purely real by symmetry. Next, a constant, b, is added to each element of $IF_I$ so the result everywhere is non-negative. The ideal array $C_I$ is then obtained by taking the inverse Fourier transform of the square root of the non-negative array:

$$C_I = FT^{-1}\{(IF_I + b)^{\frac{1}{2}}\} \quad (13)$$

This construction can be verified by autocorrelation of $C_I$, $$C_I oC_I = FT^{-1}\{(FT\{C_I\})^* FT\{C_I\}\} \quad (14)$$

$$= FT^{-1}\{IF_I + b\} \quad (15)$$

$$= F_I + b\delta \quad (16)$$

where $\delta$ the Knonecker delta function of the array indices, i.e., unity at the origin and zero everywhere else. Because the Fourier transform of the signature texture is purely real by construction, the ideal texture array $C_I$ is a self-transpose, i.e., $C_I = C_I^T$, where the superscript T denotes transposition. The additive constant b produces a spike (Kronecker delta) at the origin of the autocorrelation. The relative magnitude of the Kronecker delta depends upon the details of the ideal signature texture, $F_I$.

The ideal texture array $C_I$ is not yet well suited for use with the spread-spectrum barcode as it may contain glyph-like structures that produce recognizable features. While such features may serve as the signature pattern for use in determining translational information, it is generally desirable to distribute the features across the barcode image. In order to distribute the ideal texture array, the same modulation procedure used to distribute the user data array can also be used, i.e., $$C \equiv K_c oC_I \quad (17)$$

where $K_c$ is a self-transpose, pseudo-random kernel that is not related to any of the other data-encoding kernels. The signature texture of C can be shown to approximate $F_I$, i.e., $$CoC = (K_c oC_I) o (K_c oC_I) \quad (18)$$

$$= (C_I oK_c)^T o (K_c oC_I) \quad (19)$$

$$= C_I^T o (K_c^T oK_c) oC_I \quad (20)$$

$$\sim C_I^T o (\delta \times O(N) + R \times O(\sqrt{N})) oC_I \quad (21)$$

$$\sim C_I^T oC_I \times O(N) + R \times O(\sqrt{N}) \quad (22)$$

$$\propto F_I, \text{ with SNR } O\sqrt{N}, \quad (23)$$

where the self-transpose nature of both $K_c$ and $C_I$ have been used. If the kernel $K_c$ is not a self-transpose, only the self-transpose component of $K_c$, $([K_c^T + K_c]/2)$, contributes to the formation of the signature texture, thus reducing the SNR of the texture demodulation.

Figure 25:
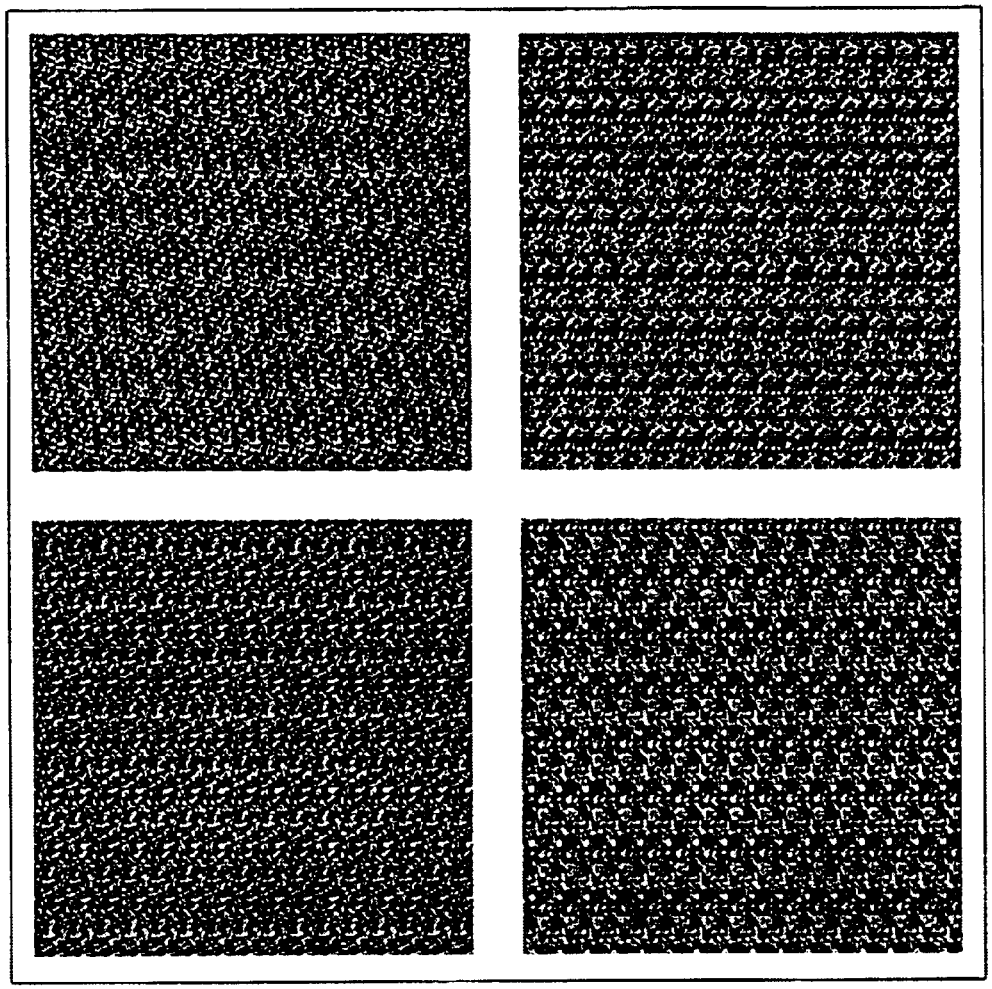
FIG. 25 shows four signature texture arrays having ideal signature textures as that shown in FIG. 24.

FIG. 25 shows four signature arrays C whose textures approximate the ideal texture shown in FIG. 24. These carriers were produced by modulation $C_I$ with four different encoding kernels.

Figure 26:
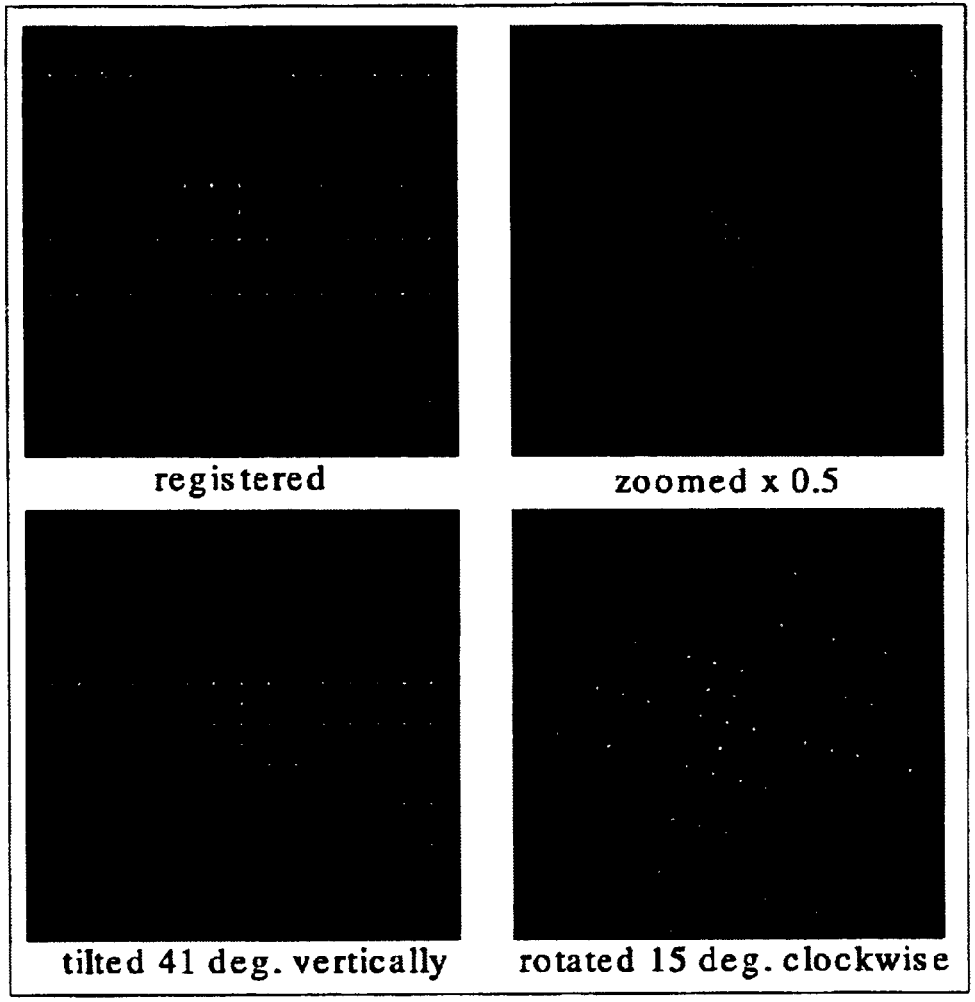
FIG. 26 shows the effects of various imaging distortions on the ideal signature texture.
Figure 27:
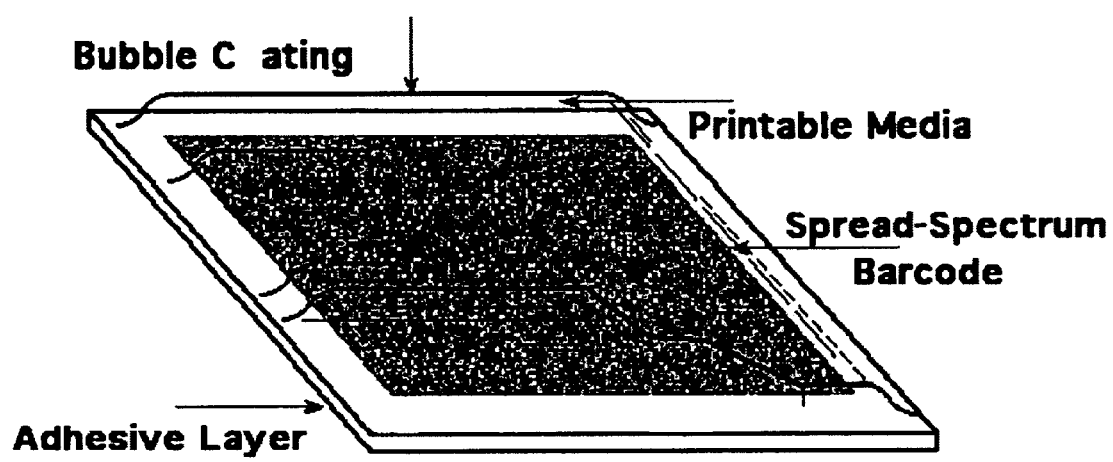
FIG. 27 illustrates one embodiment of the invention wherein the spread-spectrum barcode has been printed onto a printing media having an adhesive backing and then covered with a bubble coating.

As shown in FIG. 26, systematic distortions in the autocorrelation of the image from the ideal $F_I$ provide information about the zoom, tilt, perspective, and rotation of the barcode needed for registering the image. By examining distortions in the texture obtained from different regions of the image, barcode curvature and higher-order distortions can be inferred. This information about the shape of the surface bearing the barcode also has utility in other applications, such as mapping the surface contours or topography of an object or detecting distortions or damage to an object. One possible application is a seal or tag that would contain encoded modulated data and provide an indication were the seal to be broken or damaged. In such applications, carrier ratios greater than unity may be used so as to facilitate the retrieval of surface distortion information.

It should be noted that the textures in FIG. 26 are not identical to the ideal texture in FIG. 24. The variation in the textures is due to the presence of encoded user data in the barcode. The sum of the textures of any multiplexed encoded data is superimposed on the texture. The texture of the modulated user data array is characteristic of the specific data and the data-encoding technique and is not initially known to the barcode reader. It is, however, known to the barcode writer and can be compensated for in the selection of $F_f$. That is, $F_f$ can be replaced by $F_f$–EE, the difference of the desired texture and the texture of the data portion of the barcode. This additional procedure masks the texture of the stored data. The data texture may be used to check whether the encoded data is consistent with a given data set and is therefore a data security limitation. Thus, this masking procedure provides additional data privacy at the cost of reduced data capacity.

The relative translation of the scanned barcode image with respect to the registered barcode image is obtained by comparing corrected subimages of the barcode containing recognizable features with a signature pattern that is known by the barcode scanner. For example, the glyph-like structures in the ideal signature array that produce recognizable features, which were discussed above, may be compared to a known signature pattern. Alternatively, the recognizable subimages may be a function of the data encoding process itself. The comparison of the subimages can be conveniently automated by cross-correlations of the subimages with the known signature pattern. If required, the resulting position information can be used to improve the image registration iteratively.

The spread-spectrum barcode of the invention can be realized by a variety of means. In all cases the data and the fiduciary are "spread" over the entire barcode image. The barcodes may be "printed" by any of the standard means of production including laser, inkjet, offset, relief, etc printing. The printing of the barcodes can be "real-time" from a portable device or they can be preprocessed into an identical set or sequential series. Other means of reproduction, including embossing, photography and the like are also amenable to the realization of the barcode.

The inks may represent any of the broad spectrum of commercial and proprietary inks, as well as, new formulations intended to augment the barcodes utility. Special aspects of the inks, i.e. water solubility, low melting point, fluorescence, etc. may be used to broaden the applicability of the barcode scheme.

The spread-spectrum barcode may be applied directly to an object or printed onto a structure, i.e., paper, plastic, foil, etc. which may then be adhered to an object with glues, adhesives or the like. These barcode structures may have bare surfaces, or surfaces protected or encapsulated with transparent films and/or pouches. Either the adhesive or the protective covering may incorporate secondary features such as particles, printing, or other unique "signature" enhancing additions. Possible modifications or variations of the spread-spectrum barcode of the invention include, but are not limited to, barcodes having:

environmentally sensitive printing or construction
moisture sensitive printing or construction
chemical sensitive printing or construction
air sensitive printing or construction
UV sensitive printing or construction
damage/abuse sensitive printing or construction
tamper indicating printing or construction
temperature sensitive printing or construction
spoilage sensitive printing or construction.

It is to be understood that while the invention has been described in conjunction with the preferred specific embodiments thereof, the foregoing description is intended to illustrate and not limit the scope of the invention. Other aspects, advantages, and modifications will be apparent to those skilled in the art to which the invention pertains. All patents, patent applications, journal articles and other references cited herein are incorporated by reference in their entireties.

We claim:

1. A method of recording and printing user data on a printed medium, comprising the steps of:

a. encoding the user data to form an encoded user data array A;
   b. modulating the user data array A using a two-dimensional pseudo-random kernel $K_m$, to form a modulated data array E;
   c. formatting the data array E to produce a pixel-based two-dimensional barcode array B; and
   d. printing the barcode array B onto a portion of the printed medium, wherein the recorded and printed user data is distributed evenly across said portion of the printed medium such that each pixel of barcode array B, on average, contains an equal fraction of the user data.

2. The method of claim 1, wherein the user data is encoded so that the user data array A additionally comprises a fiducial signature.

3. The method of claim 2, wherein the fiducial signature comprises a recognizable signature texture and a signature pattern.

4. The method of claim 1, further comprising step (e) superimposing onto the barcode array B a formatted version of a two-dimensional signature array C.

5. The method of claim 4, wherein in step (a), the user data is encoded so as to have a signature texture incorporated therein, and further wherein the signature array C contains a signature pattern bitmap modulated using a two-dimensional pseudo-random kernel $K_c$.

6. The method of claim 5, wherein the two-dimensional kernels $K_m$ and $K_c$ are the same.

7. The method of claim 4, wherein the signature array C comprises a signature texture array modulated using a two-dimensional pseudo-random kernel $K_c$.

8. The method of claim 4, wherein in step (a) the user data is encoded so as to have a signature pattern incorporated therein, and further wherein, the signature array C contains a signature texture modulated using a two-dimensional pseudo-random kernel $K_c$.

9. The method of claim 8, wherein the two-dimensional pseudo-random kernels $K_c$ nd Km are the same.

10. The method of claim 1, further comprising in combination with step (c) formatting and superimposing onto the formatted data array E a second two-dimensional modulated data array E', wherein the data array E' is produced by modulating a second data set with a second two-dimensional pseudo-random kernel, $K'_m$ and the barcode array B is produced by the superimposition of the formatted data array E' onto the formatted data array E.

11. A readable barcode made using a method comprising the steps of:
   a. encoding user data to form an encoded user data array A;
   b. modulating the user data array A using a two-dimensional pseudo-random kernel $K_m$, to form a modulated data array E;
   c. formatting the data array E to produce a pixel-based two-dimensional barcode array B; and
   d. printing the barcode array B onto a portion of a printed medium,
   wherein the recorded and printed user data is distributed evenly across said portion of the printed medium such that each pixel of barcode array B, on average, contains an equal fraction of the user data.

12. The readable barcode of claim 11, wherein the user data is encoded so that the user data array A additionally comprises a fiducial signature.

13. The readable barcode of claim 11, wherein the method further comprises step (e) superimposing onto the barcode array B a formatted version of a two-dimensional signature array C.

14. The readable barcode of claim 13, wherein up to approximately 80% of the barcode has been obfuscated.

15. The readable barcode of claim 14, wherein the obfuscation is caused by overlaid text or graphics.

16. The readable barcode of claim 14, wherein the obfuscation is caused by damage or partial destruction of the printed medium.

17. A method of reading user data stored on a printed medium according to the method of claim 1, comprising;
   a. scanning the barcode array B to obtain the data array E;
   b. demodulating the data array E with a two-dimensional pseudo-random kernel $K_d$ that is related to the two-dimensional pseudo-random kernel $K_m$, to obtain the user data array A; and
   c. decoding the user data array A to obtain the encoded user data.

18. A method of reading user data stored on a printed medium according to the method of claim 2, comprising;
   a. scanning the barcode array B to obtain an uncorrected version of data array E;
   b. demodulating the data array E with a two-dimensional pseudo-random kernel $K_d$ that is related to the two-dimensional pseudo-random kernel $K_m$, to obtain an uncorrected version of the user data array A;
   c. transforming the uncorrected version of the user data array A using the fiducial signature contained therein to produce a corrected version of the user data array A; and
   d. decoding the corrected version of the user data array A to obtain the encoded user data.

19. A method of reading user data stored on a printed medium according to the method of claim 4, comprising;
   a. scanning the barcode array B to obtain a raw scan;
   b. demodulating the raw scan with a two-dimensional pseudo-random kernel $K_c$ that is not related to the two-dimensional pseudo-random kernel $K_m$, to obtain an uncorrected version of the signature array C;
   c. transforming the raw scan using the uncorrected version of signature array C to obtain a corrected version of data array E;
   d. demodulating the corrected version of data array E with a two-dimensional pseudo-random kernel $K_d$ that is related to the two-dimensional pseudo-random kernel $K_m$, to produce a corrected version of the user data array A; and
   e. decoding the corrected version of user data array A to obtain the encoded user data.

20. The method of claim 19, wherein steps (a) through (c) are performed iteratively on subsections of the barcode array B and the signature array C contains a signature texture and a signature pattern.

21. A method of reading user data stored on the barcode of claim 14 comprising the steps of
   a. scanning the barcode array B to obtain a raw scan;
   b. thresholding the raw scan;
   c. demodulating the threshold raw scan with a two-dimensional pseudo-random kernel $K_c$ that is not related to the two-dimensional pseudo-random kernel $K_m$, to obtain an uncorrected version of the signature array C;
   d. transforming the raw scan using the uncorrected version of the signature array C to obtain a corrected version of the data array E;
   e. demodulating the corrected version of the data array E with a two-dimensional pseudo-random kernel $K_d$ that is related to the two-dimensional pseudo-random kernel $K_m$ but not related to the two-dimensional pseudo-random kernel $K_c$, producing a corrected version of the user data array A; and
   f. decoding the corrected version of the user data array A to obtain the encoded user data.

22. The method of claim 21, further comprising iteratively repeating step (c) on subsections of the barcode array B and the signature array C contains a signature texture and a signature pattern.

* * * * *